United States Patent
Dencker et al.

(10) Patent No.: US 7,340,722 B2
(45) Date of Patent: Mar. 4, 2008

(54) JAVASCRIPT CLIENT FRAMEWORK

(75) Inventors: Thorsten Dencker, Ludwigshafen (DE); Claudius Fischer, Schwetzingen (DE); Andreas Röessler, Sulzfeld (DE)

(73) Assignee: Sapmarkets Inc., Palo Alto, CA (US)

( * ) Notice: Subject to any disclaimer, the term of this patent is extended or adjusted under 35 U.S.C. 154(b) by 584 days.

(21) Appl. No.: 10/094,692

(22) Filed: Mar. 11, 2002

(65) Prior Publication Data

US 2003/0172197 A1   Sep. 11, 2003

(51) Int. Cl.
*G06F 9/44* (2006.01)

(52) U.S. Cl. ............... 717/116; 717/115; 719/311; 719/312; 719/316

(58) Field of Classification Search ........ 717/101–135, 717/168–178; 719/311, 312, 316
See application file for complete search history.

(56) References Cited

U.S. PATENT DOCUMENTS

| | | | | |
|---|---|---|---|---|
| 5,848,272 A | * | 12/1998 | Breggin et al. | 719/315 |
| 6,085,229 A | * | 7/2000 | Newman et al. | 709/203 |
| 6,339,832 B1 | | 1/2002 | Bowman-Amuah | |
| 6,343,377 B1 | * | 1/2002 | Gessner et al. | 717/171 |
| 2002/0156929 A1 | * | 10/2002 | Hekmatpour | 709/310 |
| 2003/0105884 A1 | * | 6/2003 | Upton | 709/318 |
| 2004/0199603 A1 | * | 10/2004 | Tafla et al. | 709/217 |

FOREIGN PATENT DOCUMENTS

| | | |
|---|---|---|
| EP | 1 160 715 A2 | 12/2001 |
| FR | 0974900 A2 * | 7/1999 |

OTHER PUBLICATIONS

Negrino, et al., JavaScript for the World Wide Web, 4th Edition: Visual QuickStart Guide, Apr. 26, 2001, Peachpit Press, ISBN: 0-201-73517-2, pp. 1-62.*

* cited by examiner

*Primary Examiner*—Eric B. Kiss
(74) *Attorney, Agent, or Firm*—Fish & Richrdson P.C.

(57) ABSTRACT

A client-side framework for enhancing the functionality of web browsers. The client-side framework enhancing a client-side scripting language, such as JavaScript, so that it provides object-oriented features and enabling cross-window and cross-frame communications.

23 Claims, 2 Drawing Sheets

JAVASCRIPT CLIENT FRAMEWORK

FIELD OF THE INVENTION

This invention relates to a client-side framework for providing enhanced functionality to web browsers running web-based applications on client-side devices. This framework may be implemented in a client-side language, such as JavaScript.

BACKGROUND OF THE INVENTION

With the proliferation of web-based applications, the web browser has become a client for the web user. As web-based applications become more complicated, more demands are placed on the browser as the client. Many of these demands cannot be readily met by transferring them to the server for processing. Rather, the client must handle them. However, the traditional web browser client may not be able to handle all such demands.

It would therefore be beneficial to develop a client-side framework for enhancing the functionality of the web browser so that it can function both as a classic client and meet the demands of newer professional web-based applications.

SUMMARY OF THE INVENTION

The present invention consists of improving the functionality of a web browser by using a standardized client-side scripting language, such as JavaScript. The use of the standardized scripting language provides independence from browser type and version.

An embodiment of the present invention provides a framework for enhancing the functionality of a web browser.

Another embodiment of the present invention provides a JavaScript framework for enhancing the functionality of a web browser.

As such, it is an object of the present invention to enhance the functionality of a web browser to permit it to function as a classic client and to meet the demands of newer professional web-based applications.

DESCRIPTION OF THE PREFERRED EMBODIMENTS

The present invention will be better understood by reference to the accompanying drawings. The use of the term "layer" herein is a reference to a grouping based upon function. The grouping may or may not be physically dependent on another layer(s) for interfacing with other layers.

Figure 1:
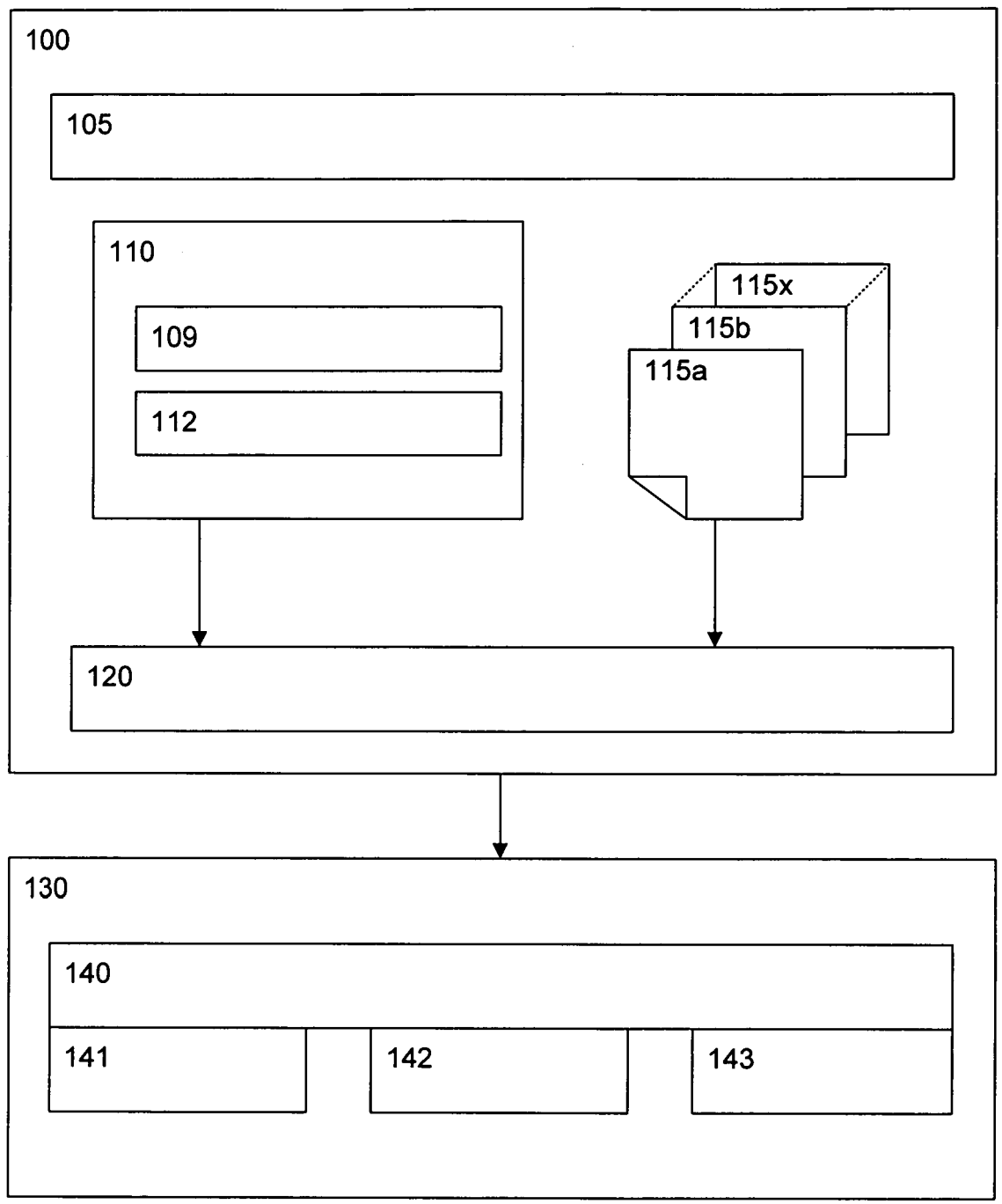
FIG. 1 is a block diagram of an XML client abstraction layer according to an embodiment of the present invention.

Referring to FIG. 1, an XML client abstraction layer 100 for use in design time is shown. The XML client abstraction layer 100 contains a definition layer 105 that defines the syntax used in XML client abstraction layer 100 and sets the parameters for the XML that is permitted to be used. Definition layer 105 is described in more detail hereinafter with reference to FIG. 2.

XML client abstraction layer 100 also includes integration logic XSLT 110. Integration logic XSLT 110 defines the translation rules for translating XML templates. Because XSLT has a very thorough syntax check, a syntax error is returned if inappropriate syntax is generated. This minimizes the occurrence of errors that would crash an application during runtime.

Integration logic XSLT 110 includes client specific logic 109 and middleware specific logic 112. Client specific logic 109 is responsible for abstracting the client on which the web-based applications will be used from the XML. Client specific logic 109 may be, for example, a client-side framework 111 as is discussed herein with respect to FIG. 3. Middleware specific logic 112 is responsible for abstracting the middleware on which the web-based applications will be used from XML.

Templates 115 a-x are present. These are XML templates.

An XML Parser 120 is present as well. It is utilized to publish applications to the middleware 130 for use during runtime. Changes to templates such as new features or improvements can be added through this layer.

Middleware 130 contains template folders 140 for storing the published templates and application servers 141, 142 and 143. A number of applications servers may be supported. These may include Java application servers, other standards-based applications servers and/or proprietary application servers.

By utilizing the XML client abstraction layer of the present invention one can provide central change of user interface, central change of function library, central error handling, central management of browser dependencies, syntax and plausibility checks, tracing and debugging, lessening of training effort required, easily readable and understandable templates, device specific views, better performance, and increased stability.

Figure 2:
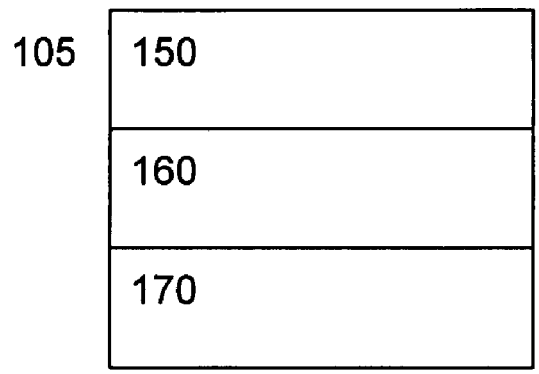
FIG. 2 is a block diagram of a definition layer defining syntax for an XML client abstraction layer according to an embodiment of the present invention.

FIG. 2 depicts the details of definition layer 105. Definition layer 105 has three major functionalities. Functionality 150 is the interface functionality. Interface functionality 150 defines data containers sent to web servers 141, 142 and 143. It also defines screen-to-screen communications, parameters and GUI components.

Event functionality 160 handles XML client abstraction layer application events, such as getDetail. Event section 160 is triggered by HTML events, such as onClick. It also provides for manipulation of GUI components, such as set/read values, and interfaces, such as sent/set parameter.

View functionality 170 defines the layout of the HTML page. It provides different views for different user profiles and different layout types. View functionality 170 uses user interface components including layout components, such as group box, and input components, such as input fields.

Figure 3:
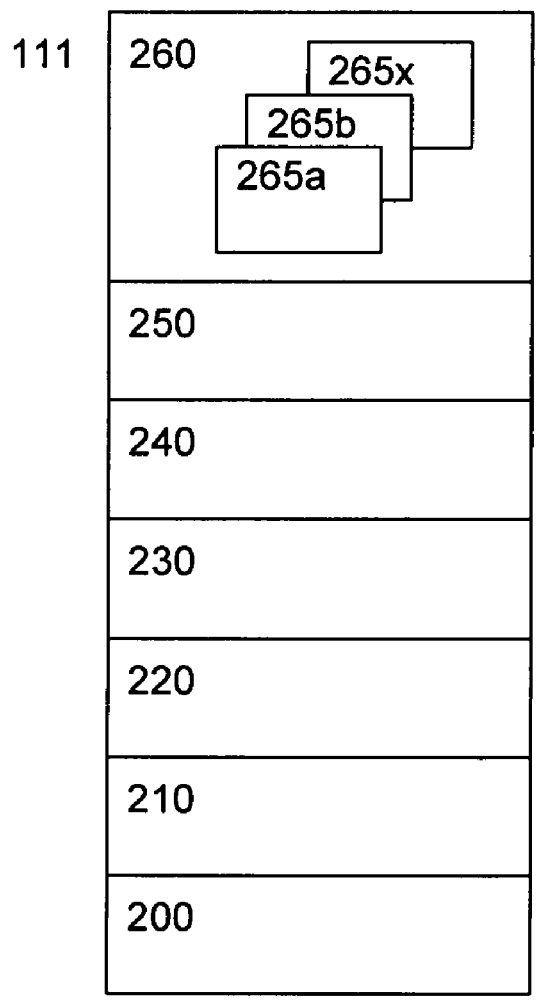
FIG. 3 is a block diagram of a JavaScript framework for an XML client abstraction layer according to an embodiment of the present invention.

Referring now to FIG. 3, a client-side framework according to an embodiment of the present invention is now described. It is important to note that this client-side framework may be used independently of XML client abstraction layer 100 in FIG. 1. The client-side framework offers special functionality that can add features to pages. One such feature is a means for communication between pages. This is especially helpful when a user may have multiple web pages open.

The client-side framework may be implemented using client-side languages such as JavaScript, VBScript, etc.

Preferably, JavaScript is used. A computer program implementing the client-side framework may be stored on a computer-readable medium.

In order to provide such a framework, the client-side language can be enhanced to provide object-oriented features, such as inheritance. Also, a library is provided for developers, so they do not need to do any actual client-side language programming (for instance, JavaScript).

Client-side framework 111 is comprised of a number of layers and provides for event control, session management, dynamic loading of content, controlling and monitoring of user input, click stream analysis, device locking, remote control, runtime debugging and client-sided event recording.

The first layer of client-side framework 111 is client-side object layer 200. This layer is a new language derived from the client-side language (for instance, JavaScript) that permits the use of object-oriented techniques, so that methods and attributes can be transported from one class to another. These techniques include the declaration of classes; the declaration of attributes and methods within a class; the instancing of objects according to a class declaration; constructor declaration; multiple inheritance; polymorphing, including the overriding and overloading of methods; helper functions such as "instanceOf" and "marshall" for object serialization; and unrestricted access to super classes and their attributes and methods. The objects demonstrate identical behavior in their functionality, independent of the browser version.

Client-side object layer 200 provides reusability, maintenance and extensibility. The technique requires the properties and methods declaration be run through only once. This provides a significant performance advantage. It means that object properties and methods are linked only once, that is when the first instance of the class is instanced.

The second layer of client-side framework 111 is object pool layer 210. Because the various client-side objects from individual windows and frames are isolated units, problems exist with object assignment and intercommunication. Object pool layer 210 is provided in order to address these problems. Object pool layer 210 encapsulates all the objects in a common object framework so that they all have the same structure because the structure of the objects within the pool is critical to proper intercommunication. Thus, object pool layer 210 effectively breaks the borders between frames and windows.

The third layer of client-side framework 111 is linking layer 220 and handles linking of HTML objects. HTML objects have restricted functionality. Client-side language functions are frequently used to supplement this functionality. However, there is no direct relationship between an HTML object and a specific client-side language instance that determines the behavior of the individual HTML object.

Linking layer 220 links the HTML object to a client-side language object. This is a one-to-one coupling. The properties of the client-side language object determine the behavior of the HTML object. The HTML object and the client-side language object reference each other and share their functionality. Intercommunication occurs by way of this referencing. Using layers 200 and 210, one can then include HTML objects in the object pool.

By providing linking layer 220, a programmer no longer needs to bind functions to HTML. Instead, the objects are bound. For instance, an object may have a method, "validate", that now permits validation of the HTML input data. This layer provides more flexibility since some things were not possible through ordinary binding functions.

The fourth layer of client-side framework 111 is communication layer 230. This layer is provided in order to allow the objects to communicate with each other and to enable access from outside the object pool. This layer utilizes an event concept to provide communication. Browser-specific events are converted by this layer to event objects of the object pool (for example, user command "keypress" of an input field). An additional listener concept is added to the event model, for example, by delegation. Communication layer 230 generates event objects within the framework and sends events to those objects that need the events. Some properties of Java are present, such as event listening by delegation.

Management layer 240 is the fifth layer of client-side framework 111. When a page in a browser is replaced by another page, its contents and their client-side language data/objects are normally lost. Thus, there should be a persistent data storage facility. Techniques to enable access to cross-object data and actions both from within and outside the object pool and also to enable these actions and data to be managed are included in management layer 240.

This layer contains a central instance object that coordinates management, including communication, window management, session management, object management and cloning of objects.

This central instance continues to exist beyond the lifetime of the frames and windows in object pool 210 and assumes a central function. It coordinates and manages the individual objects and their actions when this is necessary. It also provides central functionality. For example, saving and management of persistent data, windows management, management of the objects themselves, communication management and session management.

In order to store data/objects from a frame persistently in another frame, a cloning technique is utilized. This would duplicate the data and objects in such a way that the instance of the data/objects would be in the target frame. To enable the above, each object requires a method that first performs the cloning specific to that object and second, whenever an additional object is linked by "Has-a-Relation", for example, it calls up that object's cloning method.

An alternative solution for retaining persistent data is that the data/objects for a frame/window would be generated in a central instance and the reference to the related frame/window would be defined.

The sixth layer of the framework is pool-wide tool layer 250. Because of the introduction of the various layers described herein, pool-wide tool layer 250 is useful to simplify programming work.

Tools that could be included are development support tools, such as a tracer and a debugger; a tool that can record and playback user interactions; a tool permitting remote control of other browser instances; a remote debugger; a tool that can be used during runtime to look at the properties of the object pool or of the individual objects, and with which you can also call up the methods of such objects; and others.

The seventh layer of client-side framework 111 is application layer 260. This layer includes web applications that use the functionality of the object pool. It can provide applications with special objects using possibilities provided by the framework.

Screen interfaces 265 a-x are similar to HTML forms in that they are data containers. They generate a web server request that may lead to a response that causes the replacement of the current page.

The data contained in screen interfaces 265 a-x may consist of data or objects that originate from different frames or windows. The data is collected just before the interface is triggered (e.g., before the request is generated). As the data is being collected, general operations can be carried out. For example, data can be validated. This validation either interrupts the process before the request in the event of inconsistent data or corrects the data itself. Data can also be added that is required across different applications or across a single application. This data is stored persistently and is added automatically to each relevant screen interface 265 a-x, so data does not have to be explicitly added each time.

Therefore, screen interfaces 265 a-x are the direct interfaces to the web applications. They feed data to the applications.

The information on exactly which application status is requested is contained in each screen interface 265 a-x and consists of a URL and application-specific HTTP Post/Get parameters. These destination parameters can also be encapsulated logically in a client-side language object and are then a unique reference to a particular application status.

Screen interfaces 265 a-x may have additional parameters. They may have a field that reflects state.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A computer program stored on a computer-readable medium implementing a client-side framework for enhancing the functionality of a web browser, the framework comprising:

a client-side language object layer, said client-side language object layer providing client-side language objects including a first client-side language object and a second client-side language object, the first client-side language object being from a first window in the web browser and the second client-side language object being from a second window in the web browser, the client-side language objects each being an instance of a respective class declaration, the first client-side language object being an object of a first page, the second client-side language object being an object of a different, second page;

an object pool layer, said object pool layer permitting the assignment of objects cross-frame and cross-window, the object pool layer encapsulating the first client-side language object and the second client-side language object in a common object framework so that the first and second client-side language objects have the same structure, the first window and the second window being in the object pool layer;

a linking layer linking a first HTML object with the first client-side language object, in which linking, the first HTML object and the first client-side language object reference each other, the linking being a one-to-one coupling;

a communication layer permitting communication between objects from different windows, including communication between the first client-side language object and the second client-side language object; and a management layer providing persistent data storage for storing contents and client-side objects of a page after the page is replaced in the web browser by another page, including storing the first client-side language object persistently, for use by another page when the first page is replaced in the web browser by the other page, by calling a cloning method of the first client-side language object;

wherein the framework is executable by a web browser, the web browser functioning as a client to a web server.

2. The program of claim 1, wherein said communication layer further enables communication with sources outside of said object pool.

3. The program of claim 2, wherein said communication layer employs an event concept in a common object framework that encapsulates all objects.

4. The program of claim 3, wherein said communication layer converts browser-specific events into event objects of said object pool.

5. The program of claim 3, wherein said communication layer employs a listener.

6. The program of claim 1, wherein said management layer comprises a central instance object.

7. The program of claim 1, further comprising a pool-wide tool layer providing a plurality of tools for use pool-wide.

8. The program of claim 7, wherein said pool-wide tool layer comprises a tracer and a debugger.

9. The program of claim 7, wherein said pool-wide tool layer comprises a tool that can record and playback user interfaces.

10. The program of claim 7, wherein said pool-wide tool layer comprises a tool permitting remote control of other browser instances.

11. The program of claim 7, wherein said pool-wide tool layer comprises a remote debugger.

12. The program of claim 7, wherein said pool-wide tool layer comprises a tool that can be used during runtime to look at properties of said object pool or of individual objects.

13. The program of claim 1, further comprising an application layer that can provide applications with objects created by the framework.

14. The program of claim 1, further comprises a plurality of screen interfaces.

15. The program of claim 1, wherein said client-side framework is implemented at least in part in a client-side scripting language.

16. The program of claim 15, wherein said client-side language objects comprise client-side scripting language objects.

17. The program of claim 1, wherein the properties of the first client-side language object determine the behavior of the first HTML object.

18. A client-side device executing a web browser, the web browser comprising:

a client-side framework executed by the web browser when running as a client for a user of a web-based application, the framework comprising:

a client-side language object layer, the client-side language object layer providing client-side language objects including a first client-side language object and a second client-side language object, the first client-side language object being from a first window in the web browser and the second client-side language object being from a second window in the web browser, the client-side language objects each being an instance of a respective class declaration, the first client-side language object being an object of a first page, the second client-side language object being an object of a different, second page;

an object pool layer, the object pool layer permitting the assignment of objects cross-flame and cross-window, the object pool layer encapsulating the first client-side language object and the second client-side language object in a common object framework so that the first and second client-side language objects have the same structure, the first window and the second window being in the object pool layer;

a linking layer linking a first HTML object with the first client-side language object, in which linking, the first HTML object and the first client-side language object reference each other, the linking being a one-to-one coupling;

a communication layer permitting communication between objects from different windows, including communication between the first client-side language object and the second client-side language object; and a management layer providing persistent data storage for storing contents and client-side objects of a page after the page is replaced in the web browser by another page, including storing the first client-side language object persistently for use by another page when the first page is replaced in the web browser by the other page, by calling a cloning method of the first client-side language object.

19. The web browser of claim 18, wherein:

the communication layer further enables communication with sources outside of the object pool; and the communication layer converts browser-specific events into event objects of the object pool.

20. The web browser of claim 18, the framework further comprising an application layer that can provide applications with objects created by the framework.

21. The web browser of claim 18, the framework further comprising a plurality of screen interfaces.

22. The web browser of claim 18, wherein:

the client-side framework is implemented at least in part in a client-side scripting language; and the client-side language objects comprise client-side scripting language objects.

23. The web browser of claim 18, wherein the properties of the first client-side language object determine the behavior of the first HTML object.

* * * * *